(12) United States Patent
Hecox et al.

(10) Patent No.: US 11,429,473 B2
(45) Date of Patent: Aug. 30, 2022

(54) AUTOMATED PROBLEM RESOLUTION

(71) Applicant: Red Hat, Inc., Raleigh, NC (US)

(72) Inventors: Andrew H. Hecox, Raleigh, NC (US);
Gavin Romig-Koch, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1088 days.

(21) Appl. No.: 15/364,835

(22) Filed: Nov. 30, 2016

(65) Prior Publication Data
US 2018/0150348 A1 May 31, 2018

(51) Int. Cl.
*G06F 11/07* (2006.01)
*G06F 11/30* (2006.01)

(52) U.S. Cl.
CPC ........ *G06F 11/0793* (2013.01); *G06F 11/079* (2013.01); *G06F 11/3051* (2013.01)

(58) Field of Classification Search
CPC .............. G06F 11/0793; G06F 11/079; G06F 11/3476; G06F 11/3051; G06F 11/30; G06F 11/3006
See application file for complete search history.

(56) References Cited

U.S. PATENT DOCUMENTS

| | | | |
|---|---|---|---|
| 7,263,632 B2 | 8/2007 | Ritz et al. | |
| 7,580,906 B2 | 8/2009 | Faihe | |
| 8,621,278 B2 | 12/2013 | Petukhov et al. | |
| 8,738,760 B2 | 5/2014 | Adams, Jr. et al. | |
| 9,313,091 B1* | 4/2016 | Schnegelberger | H04L 41/16 |
| 9,542,259 B1* | 1/2017 | McEwen | G06F 11/0793 |
| 2002/0052718 A1* | 5/2002 | Little | G06F 11/2257 702/188 |
| 2013/0007527 A1* | 1/2013 | Petukhov | G06F 11/0793 714/37 |
| 2013/0089847 A1* | 4/2013 | Baker | G09B 7/00 434/322 |
| 2013/0283088 A1* | 10/2013 | Behrendt | G06F 11/0793 714/2 |
| 2014/0082407 A1* | 3/2014 | Kochut | H04L 41/00 714/2 |
| 2016/0224406 A1* | 8/2016 | Ilic | G06F 11/0748 |
| 2016/0350173 A1* | 12/2016 | Ahad | G06F 11/3495 |
| 2016/0357625 A1* | 12/2016 | Balakrishnan | G06F 11/0709 |

* cited by examiner

*Primary Examiner* — Yolanda L Wilson
(74) *Attorney, Agent, or Firm* — Dority & Manning, P.A.

(57) ABSTRACT

Mechanisms for generating a remediation script to resolve a problem condition in a remote computing device are provided. System information associated with a remote computing device is accessed. A plurality of rules that process the system information are run. Each rule is configured to determine whether a problem condition of a plurality of problem conditions exists in the remote computing device. At least one rule determines, based on the system information, that a problem condition exists. A remediation script is generated from a template based on at least one characteristic of the remote computing device, that, if executed on the remote computing device, implements a first solution that resolves the problem condition.

15 Claims, 10 Drawing Sheets

Openssh MaxAuthTries bypass security flaw (CVE-2015-5600) — 82

A flaw in openssh could allow an attacker to request a large number of keyboard-interactive devices when entering a password and bypass the MaxAuthTries limit. This issue is dependent on KbdInteractiveAuthentication and ChallengeResponseAuthentication settings in sshd_config.

IMPACTED SYSTEMS          3 IMPACTED SYSTEMS                    80-1

☐ Select All

☐ RHEL Server    crm1-phx-dc2e
☐ RHEL Server    crm2-phx-dc2e
☐ RHEL Server    crm3-phx-dc2e

FIG. 4A

CREATE SCRIPT 80-2

Rule summary:
A flaw in openssh could allow an attacker to bypass the MaxAuthTries limit and perform a brute-force attack on the system.
This issue was reported as CVE -2015-5600.

| UPGRADE Openssh-server package 84-1 | DISABLE Openssh daemon 84-2 | DISABLE KbdInteractiveAuthentication 84-3 | DISABLE ChallengeResponseAuthentication 84-N |

CREATE SCRIPT 80-3

Rule summary:
A flaw in openssh could allow an attacker to bypass the MaxAuthTries limit and perform a brute-force attack on the system.
This issue was reported as CVE-2015-5600.

[DOWNLOAD SCRIPT] 86

AUTOMATED PROBLEM RESOLUTION

TECHNICAL FIELD

The examples relate generally to resolving problems in a computing device, and in particular to automated resolution of problems in a computing device.

BACKGROUND

Often when a user of a computing device encounters a problem, the user searches repositories of data, such as a knowledgebase, to determine whether the problem has been encountered by others, and if so, whether the knowledgebase identifies a solution to the problem.

SUMMARY

The examples discussed herein automatically, without human involvement, analyze system information received from remote computing devices, such as a service provider's customers' computing devices, to detect and identify problem conditions. Upon detecting a problem condition based on the system information, the examples generate a remediation script, based at least in part on a known characteristic of the remote computing device. The remediation script may then be executed on the remote computing device to resolve the problem condition.

In one example, a method of generating a remediation script to resolve a problem condition in a remote computing device is provided. The method includes accessing, by a computing device comprising a processor device, system information associated with a remote computing device. The method further includes running, by the computing device, a plurality of rules that process the system information, each rule configured to determine whether a problem condition of a plurality of problem conditions exists in the remote computing device. The method further includes determining, by at least one rule based on the system information, that a problem condition exists. The method further includes generating, from a template, based on a characteristic of the remote computing device, a remediation script that, if executed on the remote computing device, implements a first solution that resolves the problem condition.

In another example, a computing device for generating a remediation script to resolve a problem condition in a remote computing device is provided. The computing device includes a memory and a processor device coupled to the memory. The processor device is to access system information associated with a remote computing device. The processor device is further to run a plurality of rules that process the system information, each rule configured to determine whether a problem condition of a plurality of problem conditions exists in the remote computing device. The processor device is further to determine, by at least one rule based on the system information, that a problem condition exists, and generate, from a template, based on a characteristic of the remote computing device, a remediation script that, if executed on the remote computing device, implements a first solution that resolves the problem condition.

In another example, a computer program product for generating a remediation script to resolve a problem condition in a remote computing device is provided. The computer program product is stored on a non-transitory computer-readable storage medium and includes instructions to cause a processor device to access system information associated with a remote computing device. The instructions further cause the processor device to run a plurality of rules that process the system information. Each rule is configured to determine whether a problem condition of a plurality of problem conditions exists in the remote computing device. The instructions further cause the processor device to determine, by at least one rule based on the system information, that a problem condition exists. The instructions further cause the processor device to generate, from a template, based on a characteristic of the remote computing device, a remediation script that, if executed on the remote computing device, implements a first solution that resolves the problem condition.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIGS. 4A-4C illustrate example user interfaces that may be presented to an operator to facilitate selection of a solution of a plurality of different solutions for resolving a problem condition, according to one example;

DETAILED DESCRIPTION

Figure 1:
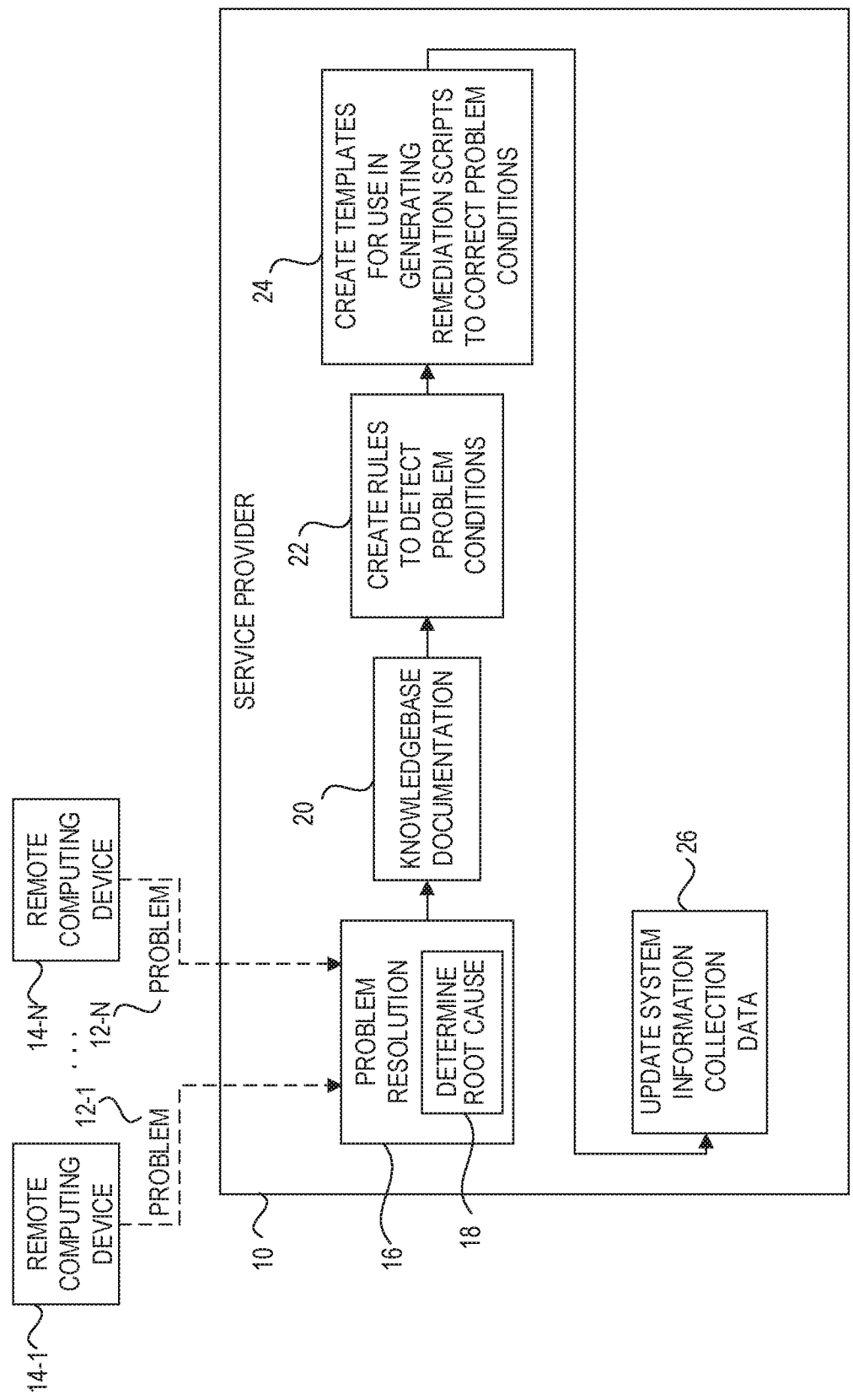
FIG. 1 is a block diagram that illustrates actions taken in a first stage of a multi-stage process according to one example.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first solution" and "second solution," and does not imply a priority, a type, an importance, or other attribute, unless otherwise stated herein. As used herein and in the claims, the articles "a" and "an" in reference to an element refers to "one or more" of the element unless otherwise explicitly specified.

A computer technology service provider, such as a computer software service provider, often includes support services to a customer in conjunction with providing computer software to the customer. Over time, the service provider learns of problems that its customers encounter. Typically, the service provider analyzes the problem and attempts to determine the cause of the problem so that the problem can be resolved. Problem analysis and resolution may take a substantial amount of time. After a resolution to a problem is identified, the service provider may generate information that identifies the problem and the resolution, and make this information available to its support staff and perhaps its customers in a searchable manner so that if the problem is encountered again in the future, the resolution can more quickly be identified.

Even with such information available, a service provider can expend a substantial amount of time and corresponding cost processing a service request from a customer, researching and determining that the problem has been previously encountered by another customer, and communicating the resolution to the customer. Often problem analysis can identify a root cause of the problem that can be identified even prior to the problem occurring. The root cause may lie dormant until some event occurs, such as when a configuration option is set, a message of a particular type is received, a service is initiated, or the like.

The examples discussed herein automatically, without human involvement, analyze system information received from remote computing devices, such as a service provider's customers' computing devices, to detect and identify problem conditions. Upon detecting a problem condition based on the system information, the examples generate a remediation script, based at least in part on a known characteristic of the remote computing device, which, if executed on the remote computing device, resolves the problem condition. Among other advantages, the examples substantially reduce manual efforts necessary to identify problems and resolutions. The examples also, in many instances, resolve a problem condition prior to the problem ever occurring in a remote computing device, and thus increase availability of the remote computing device, and increase customer satisfaction.

The process implemented in the examples can be described as part of a multi-stage process wherein a first stage involves the analysis of problems encountered on remote computing devices and actions taken by subject matter experts (SMEs) in response to such problems. In this regard, FIG. 1 is a block diagram that illustrates actions taken in a first stage according to one example. A service provider 10 receives notifications and information regarding a plurality of problems 12-1-12-N (generally, problems 12) encountered by a plurality of different remote computing devices 14-1-14-N (generally, remote computing devices 14). At block 16 problem resolution occurs, which can involve SMEs, who are knowledgeable in the relevant technology, analyzing the problems 12 to determine both a cause of the problems 12 and a resolution of the problems 12. This process may take varying amounts of time depending on the particular problem 12, and may involve communications with operators associated with the remote computing devices 14. This process may also involve analyzing system information associated with the remote computing devices 14. For at least some of the problems 12, at block 18, a root cause of the problem 12 will be determined. The root cause may identify a problem condition that exists prior to the problem occurring, such as a configuration setting, information existing in a wrong location, a mismatch between program versions, or the like, which, if corrected, may completely prevent the problem 12 from ever occurring.

At block 20, knowledgebase documentation is generated that identifies the problem, the resolution, and if determined, a root cause of the problem. This knowledgebase documentation may be made available to support personnel of the service provider, and/or those of the customers, for subsequent analysis to attempt to locate a resolution to a future problem encountered by a customer.

In one example, at block 22, SMEs of the service provider 10 analyze the knowledgebase documentation and create rules that process system information received from a remote computing device 14, and based on the system information, detect a problem condition. Each rule may process the system information to identify a particular problem condition. The rules may be written in any desired language, such as a scripting language, or the like.

The SMEs also create, at block 24, templates for each rule. Each template identifies actions that can implement a solution to resolve the problem condition. As will be discussed in greater detail herein, the templates are used to generate remediation scripts, which, if executed on the remote computing device, implement the solution to correct the problem condition. A problem may have a number of different solutions. In some examples, one template may correspond to multiple solutions. In other examples, each template may correspond to a single solution, and thus multiple templates may exist for a single problem condition.

As will be discussed in greater detail with regard to FIG. 2, during a second stage, system information is periodically or intermittently collected by the remote computing devices 14 and provided to the system provider 10 for analysis by the rules. In order to determine what system information to collect, the remote computing devices 14 periodically, or intermittently, request system information collection data from the service provider 10 that identifies to the remote computing devices 14 what system information should be collected. If a problem 12 is analyzed at block 16, and a root cause determined at block 18, but the current system information that is being collected does not contain the system information necessary to identify the problem condition, at block 26 the SME updates the system information collection data so that such system information will thereafter be collected by the remote computing devices 14 and provided to the system provider 10. Note that the process described herein with regard to blocks 16-26 is generally an on-going and continuous process over time. Thus, as the service provider 10 learns of new problems 12 on an on-going basis, new templates, rules, and system information collection data may be generated in accordance with the process described herein.

Figure 2:
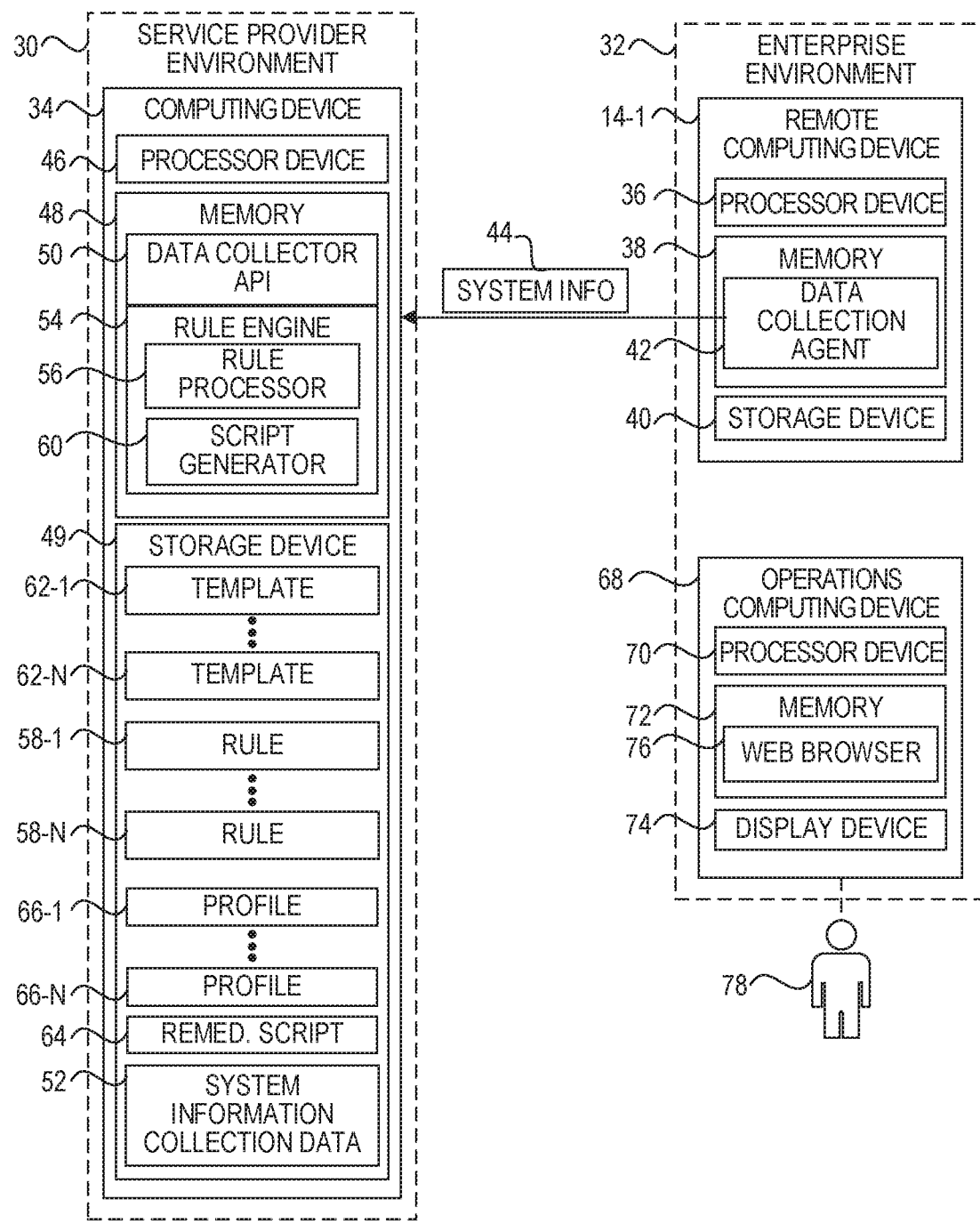
FIG. 2 is a block diagram of an environment in which examples may be practiced.

FIG. 2 is a block diagram of an environment 28 in which examples may be practiced. The discussion herein with regard to FIG. 2 can be described as a second stage in the multi-stage process mentioned above. It should be noted that the first stage and the second stage may be occurring concurrently. The environment 28 includes a service provider environment 30 of the service provider 10 (FIG. 1) and an enterprise environment 32 of a customer. While for purposes of illustration only a single enterprise environment 32 is illustrated, in practice, the service provider 10 may support tens, hundreds, or thousands of different customers, and the process described herein below may be occurring concurrently with a large number of enterprise environments 32.

The enterprise environment 32 includes a remote computing device 14-1 and the service provider environment 30 includes a computing device 34. The term "remote" in the phrase "remote computing device 14" simply refers to the remote computing device 14 being separate from the computing device 34, and does not imply any particular distance or other attribute. While only a single remote computing device 14-1 is illustrated, the enterprise environment 32 may include tens, hundreds, or thousands of remote computing devices 14, and the process described herein may be occurring substantially concurrently with all of such remote computing devices 14.

The remote computing device 14-1 includes a processor device 36, a memory 38, and a storage device 40. A data collection agent 42 periodically, or intermittently, provides system information 44 to the computing device 34. Such information may, for example, be provided once a day, once an hour, and/or after certain events, such as after the installation of a new software package on the remote computing device 14-1. The data collection agent 42 may be provided to the remote computing device 14-1 via a network (not illustrated), or as part of a system package installed on the remote computing device 14-1.

The computing device 34 includes a processor device 46, a memory 48, and a storage device 49. The memory 48 may include one or more executing processes, such as a data collector API 50 that may be invoked periodically or intermittently by the data collection agent 42 to provide the system information 44 to the computing device 34. The data collector API 50 may also be invoked periodically or intermittently by the data collection agent 42 to request system information collection data 52, which may be maintained, for example, in the storage device 49. As discussed above with regard to FIG. 1, the system information collection data 52 identifies to the remote computing device 14-1 what system information 44 should be collected by the remote computing device 14-1. The system information 44 may include any information that may identify a problem condition on the remote computing device 14-1, and may include, by way of non-limiting example, one or more of the following files:

/boot/grub/grub.conf
/boot/grub2/grub.cfg
/etc/cinder/cinder.conf
/etc/fstab
/etc/haproxy/haproxy.cfg
/etc/heat/heat.conf
/etc/hosts
/etc/kdump.conf
/etc/modprobe.conf
/etc/modprobe.d/*.conf
/etc/muitipath.conf
/etc/my.cnf.d/galera.cnf
/etc/nova/nova.conf
/etc/pam.d/password-auth
/etc/rc.d/rc.local
/etc/redhat-access-insights/machine-id
/etc/redhat-release
/etc/redhat_access_proactive/machine-id
/etc/resolv.conf
/etc/security/limits.conf
/etc/security/limits.d/.*-nproc.conf
/etc/selinux/confg
/etc/sysconfg/corosync
/etc/sysconfg/docker
/etc/sysconfg/kdump
/etc/sysconfg/netconsole
/etc/sysconfg/network-scripts/ifcfg-.*
/etc/vdsm/vdsm.conf -continued /proc/cmdline
/proc/cpuinfo
/proc/driver/cciss/cciss.*
/proc/interrupts
/proc/mdstat
/proc/meminfo
/proc/net/bonding/bond.*
/proc/net/netflter/nfnetlink_queue
/proc/scsi/scsi
/sys/devices/system/clocksource/clocksource0/current_clocksource
/sys/kernel/kexec_crash_loaded
/sys/kernel/mm/ksm/run
/usr/lib/systemd/system/docker.service
/var/crash/.*/vmcore-dmesg.txt
/var/lib/pacemaker/cib/cib.xml
/var/log/redhat-access-insights/redhat-access-insights.log
/var/log/redhat_access_proactive/redhat_access_proactive.log;
/etc/httpd/conf.d/.+.conf
/etc/keystone/keystone.conf
keystone.identity.backends
/etc/rsyslog.conf
/etc/sysctl.conf
/var/log/messages
/etc/cluster/cluster.conf
/etc/nscd.conf
/var/log/yum.log
/etc/lvm/lvm.conf
/var/log/pacemaker.log
/etc/neutron/neutron.conf
/etc/ovirt-engine/engine.conf.d/.*
/etc/ImageMagick.*/policy.xml
/etc/vsftpd/vsftpd.conf
/etc/pam.d/vsftpd
/etc/httpd/conf/httpd.conf
/etc/ssh/sshd_confg
/etc/nsswitch.conf
/var/log/vdsm/vdsm.log
/etc/samba/smb.conf
/var/log/dirsrv/slapd-.*/errors The system information 44 may also include information generated in response to one or more of the following commands:

/bin/date
/bin/hostname
/bin/ls -lanR /boot
/bin/lsblk
/bin/mount
/bin/netstat -neopa
/bin/netstat -s
/bin/ps auxcww
/bin/rpm -V coreutils procps procps-ng shadow-utils passwd sudo
/bin/rpm -qa --qf='{"name": "%{NAME}", "version": "%{VERSION}","epoch": "%{EPOCH}","release": "%{RELEASE}","arch": "%{ARCH}","installtime": "%{INSTALLTIME:date}","buildtime": "%{BUILDTIME}","rsaheader": "%{RSAHEADER:pgpsig}","dsaheader": "%{DSAHEADER:pgpsig}"}\n'
/bin/uname -a
/sbin/chkconfg --list
/sbin/dcbtool gc dcb
/sbin/dumpe2fs -h
/sbin/ethtool
/sbin/ethtool -S
/sbin/ethtool -a
/sbin/ethtool -c
/sbin/ethtool -g
/sbin/ethtool -i
/sbin/ethtool -k
/sbin/ip addr
/sbin/ip route show table all -continued

```
/sbin/lsmod
/sbin/lspci
/sbin/lvs -a -o
lv_name,vg_name,lv_size,region_size,mirror_log_lv_attr,devices
/sbin/multipath -v4 -ll
/sbin/parted -l
/sbin/pvs
/usr/bin/chronyc sources
/usr/bin/df -alP
/usr/bin/df -li
/usr/bin/docker images --all --no-trunc --digests
/usr/bin/docker info
/usr/bin/docker inspect --type=container
/usr/bin/docker inspect --type=image {DOCKER_IMAGE_NAME}
/usr/bin/docker ps --all --no-trunc --size
/usr/bin/fnd /var/crash /var/tmp -path'.reports-/whoopsie-report'
/usr/bin/ls -l /boot/grub2/grub.cfg
/usr/bin/ovs-vsctl show
/usr/bin/uptime
/usr/bin/yum -C repolist
/usr/sbin/blkid -c /dev/null
/usr/sbin/dmidecode
/usr/sbin/getenforce
/usr/sbin/ntpq -pn
hponcfg -g
ls -l /etc/ssh/sshd_confg
rabbitmqctl list_queues name messages consumers auto_delete
systemctl list-unit-fles
/sbin/sysctl -a
/usr/bin/lsinitrd /boot/initramfs-kdump.img -f /etc/sysctl.conf
/etc/sysctl.d/.conf
/usr/bin/crontab -l -u heat
/bin/dmesg
/bin/ls -lanR /etc
/usr/bin/crontab -l -u root
/usr/bin/crontab -l -u keystone
rabbitmqctl report
/bin/ps aux
/sbin/vgdisplay
lsof
```

The memory 48 also includes a rule engine 54 for processing the system information 44. In one example, the rule engine 54 includes a rule processor 56 that processes a plurality of rules 58-1-58-N (generally, rules 58). Each rule 58 is configured to analyze the system information 44 to determine whether a problem condition exists. If a rule 58 determines that a problem condition exists, a script generator 60 accesses one of a plurality of templates 62-1-62-N (generally, templates 62) to generate a remediation script 64 that, if executed on the remote computing device 14-1, implements a solution that resolves the problem condition. Each template 62 corresponds to a particular rule 58 and identifies actions that can implement the solution to resolve the problem condition identified by the corresponding rule 58.

While for purposes of illustration functionality discussed herein may be attributed to one or more of the rule engine 54, the rule processor 56, or the script generator 60, it will be noted that such division of functionality is solely for purposes of illustration, and that such functionality may in other examples be implemented in a single process, or in a number of processes greater than three. Moreover, because the rule engine 54, the rule processor 56, and the script generator 60 are components of the computing device 34, functionality implemented by any of these processes may be attributed to the computing device 34 generally. Moreover, in examples where the rule engine 54, the rule processor 56, and the script generator 60 comprise software instructions that program the processor device 46 to carry out functionality discussed herein, functionality implemented by such processes may be attributed herein to the processor device 46.

The storage device 49 also includes a plurality of profiles 66-1-66-N (generally, profiles 66), each of which is associated with a particular enterprise environment 32. Each profile 66 may, for example, identify characteristics of the remote computing device 14-1 in terms of preferences that may be used by the script generator 60 to generate a remediation script 64 that is customized in accordance with the profile 66 for the remote computing device 14-1.

The enterprise environment 32 may also include an operations computing device 68 that includes a processor device 70, a memory 72, and a display device 74. The memory 72 may execute a web browser 76 via which an operator 78 may communicate with the operations computing device 68, as discussed in greater detail below.

Figure 3:
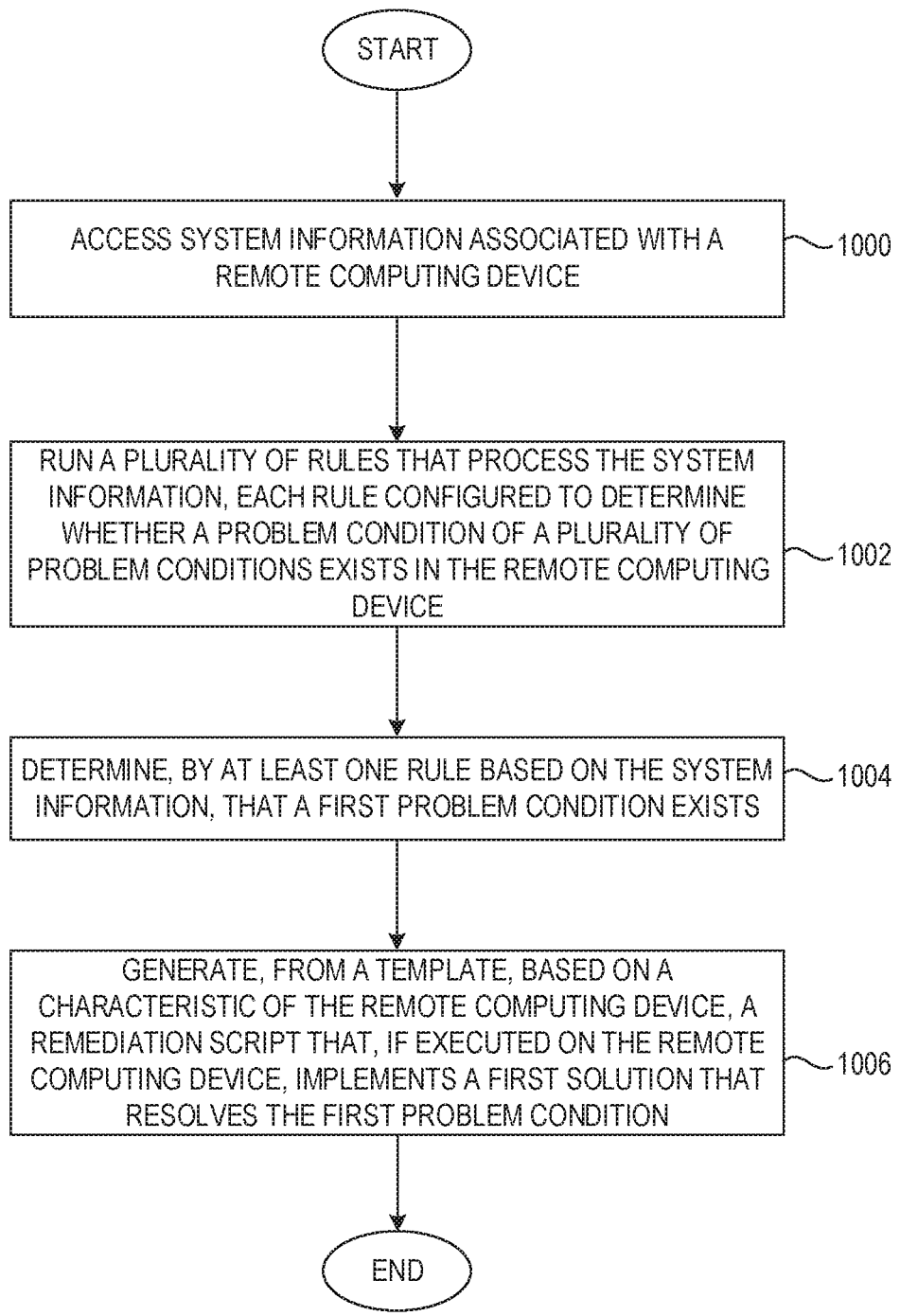
FIG. 3 is a flowchart of a method for generating a remediation script to resolve a problem condition in a remote computing device, according to one example.

FIG. 3 is a flowchart of a method for generating a remediation script to resolve a problem condition in a remote computing device, according to one example. FIG. 3 will be discussed in conjunction with FIG. 2. The computing device 34 accesses the system information 44 associated with the remote computing device 14-1 (FIG. 3, block 1000). The computing device 34 runs the plurality of rules 58. Each rule 58 processes the system information 44 and is configured to determine whether a problem condition exists in the remote computing device 14-1 based on the system information 44 (FIG. 3, block 1002). Thus each rule 58 examines the system information 44 to determine whether one or more criterion meet certain conditions that identifies a problem condition.

Assume for purposes of illustration that at least one rule 58, based on the system information 44, determines that a first problem condition exists (FIG. 3, block 1004). As an example, assume that the rule 58 processes the system information 44 to determine whether a particular security flaw is identified in the system information 44. The particular security flaw exists if the version of OpenSSH installed on the remote computing device 14-1 is one of a predetermined set of versions of OpenSSH known to be vulnerable to this security flaw, and if either of the OpenSSH daemon configuration settings ChallengeResponseAuthentication or KbdInteractiveAuthentication are enabled on the remote computing device 14-1. Thus, the rule 58 processes the system information 44 to determine the version of OpenSSH that exists on the remote computing device 14-1, and compares the version of OpenSSH to the predetermined set of versions known to be vulnerable to this security flaw. In a Red Hat® operating system, this information may be identified in the RPM database, which may be provided to the computing device 34 as part of the system information 44. If the rule 58 determines that the version of OpenSSH that exists on the remote computing device 14-1 is one of the predetermined set of versions known to be vulnerable to this flaw, the rule 58 analyzes the system information 44 to determine whether the OpenSSH daemon configuration settings ChallengeResponseAuthentication or KbdInteractiveAuthentication are enabled on the remote computing device 14-1. In a Red Hat® operating system, this information may be identified in the configuration file "/etc/ssh/sshd_config," which may also be provided to the computing device 34 as part of the system information 44. If either the OpenSSH daemon configuration settings ChallengeResponseAuthentication or KbdInteractiveAuthentication are enabled on the remote computing device 14-1, the rule 58 determines that a problem condition exists.

The script generator 60 may then generate, from a template 62 that corresponds to the rule 58, and based on a characteristic of the remote computing device 14-1, a remediation script 64 that, if executed on the remote computing device 14-1, implements a first solution that resolves the first problem condition (FIG. 3, block 1006).

In one example, each problem condition may be resolved via one or more solutions. Different solutions may exist because different solutions may have different impacts on the remote computing device 14-1, or for other reasons. The script generator 60, in one example, accesses the profile 66 that corresponds to the enterprise environment 32, and based on information contained in the profile 66, selects one of the solutions. The profile 66 identifies characteristics of the remote computing device 14-1, such as preferences and/or operating environment characteristics. The script generator 60 generates a remediation script that, if executed on the remote computing device 14-1, implements a first solution that resolves the first problem condition. The remediation script may comprise programming language instructions, or other types of instructions that implement actions that are identified in the template 62. In one example the remediation script comprises a Red Hat® Ansible® playbook and utilizes YAML format, but the examples are not limited to any particular format. The profile 66 may also identify criteria about the remote computing device 14-1, such as an operating system release version, or other factors, to which the remediation script is customized. The system information 44 may also identify characteristics of the remote computing device 14-1 that can be used by the script generator 60 to customize the remediation script for the particular remote computing device 14-1.

In some examples, as discussed in greater detail below, the solution may be selected and then presented to the operator 78 for confirmation prior to execution. In other examples all available solutions may be the presented to the operator 78, and the operator 78 may select a preferred solution. In other examples, the solution may be selected by the script generator 60 and automatically implemented on the remote computing device 14-1 without human involvement.

In some examples, each solution may have associated metadata that describes characteristics of the solution, such as metadata that indicates a first solution requires a reboot of the remote computing device 14-1 but completely resolves the problem condition, while a second solution does not require a reboot of the remote computing device 14-1 and resolves the problem condition but disables other functionality associated with the remote computing device 14-1 when implemented on the remote computing device 14-1. The profile 66 may contain information that identifies the remote computing device 14-1 as a particular type of environment, such as a development environment or a production environment. The script generator 60 may be configured to determine that, for a production environment, a solution that does not cause a reboot of the remote computing device 14-1 is preferred, and thereby select the second solution. If the remote computing device 14-1 is identified in the profile 66 as a development environment, the script generator 60 may be configured to select the first solution.

Each problem condition may also have associated metadata that characterizes the corresponding problem, such as, by way of non-limiting example, a problem status that identifies a severity of the problem, such as low impact, moderate impact, or severe impact. Each solution to the problem condition may also have associated metadata that identifies a disruption status of the solution, such as no disruption, moderate disruption, or severe disruption. No disruption, for example, may mean no user of the remote computing device 14-1 will be impacted when the remediation script 64 is executed on the remote computing device 14-1. Moderate disruption, for example, may mean that no user of the remote computing device 14-1 will be impacted for more than 10 seconds when the remediation script 64 is executed on the remote computing device 14-1. Severe disruption, for example, may mean that the remote computing device 14-1 will be rebooted during execution of the remediation script 64. The profile 66 may contain information, such as a mapping, that maps a problem status of the problem condition to a particular disruption status of the solution. For example, the mapping may indicate that the disruption status of the solution is not taken into consideration if the problem status of the problem condition is a severe impact. The mapping may indicate that for a problem status of low impact, only a solution having a disruption status of no disruption can be implemented. Based on one or more of the problem status of the problem condition, the disruption status of the solution, and the mapping, the script generator 60 identifies a suitable solution, and generates the remediation script 64 for execution on the remote computing device 14-1.

As mentioned above, in some examples the script generator 60 may generate solution information that identifies each solution of a plurality of different solutions that can resolve the problem condition, and sends the solution information to a device where the different solutions can be reviewed, and a particular solution can be selected by a human. For example, the script generator 60 may send the solution information to the operations computing device 68 for review by the operator 78. The solution information may be sent to the operations computing device 68, in one example, in response to a request from a web browser 76 for solutions to the identified problem condition. The operator 78 may review the solutions and, via an input device such as a mouse or keyboard, select one of the solutions. The script generator 60 receives, from the operations computing device 68, the selection, and generates a remediation script 64 that implements the selected solution.

In this regard, FIGS. 4A-4C illustrate example user interfaces that may be presented to the operator 78 to facilitate selection of a solution of a plurality of different solutions for resolving a problem condition. For purposes of illustration, assume that there are four solutions to resolving the problem condition identified above with regard to FIG. 3. A first solution involves upgrading the current OpenSSH package to another OpenSSH package that is not in the set of vulnerable versions. A second solution involves disabling the OpenSSH daemon completely. A third solution involves disabling KbdInteractiveAuthentication, and a fourth solution involves disabling Challenge ResponseAuthentication.

The script generator 60 may first generate problem information that identifies the problem condition and send the problem information to the operations computing device 68 for certain preliminary decisions by the operator 78. Referring now to FIG. 4A, the operations computing device 68 formats the problem information into a user interface 80-1, and presents the user interface 80-1 on the display device 74. The user interface 80-1 identifies the problem condition in a box 82, and also identifies the remote computing devices, including the remote computing device 14-1, that are in the enterprise environment 32, and which each have the problem condition. The user interface 80-1 may allow the operator 78 to select one or more of the remote computing devices 14 on which a solution should be implemented. For purposes of illustration, assume that the operator 78 selects all of the remote computing devices 14.

The script generator 60 receives the selection, and generates solution information that identifies the four solutions, and sends the solution information to the operations computing device 68. Referring now to FIG. 4B, the operations computing device 68 formats the solution information into a user interface 80-2, and presents the user interface 80-2 on the display device 74. The user interface 80-2 includes four selectable controls 84-1-84-N, each of which corresponds to one of the four potential solutions to resolve the problem condition. Each selectable control 84-1-84-N includes text that contains a brief summary of the particular solution. The operator 78 may select any one of the selectable controls 84-1-84-N. After such a selection, in one example, the script generator 60 generates the remediation script 64, and sends a download link for the remediation script 64 to the operations computing device 68. Referring now to FIG. 4C, the operations computing device 68 formats the download link into a user interface 80-3, and presents the user interface 80-3 on the display device 74. The user interface 80-3 includes a selectable download control 86, which, if selected, downloads the remediation script 64. After the remediation script 64 is downloaded, the operator 78 may execute the remediation script 64 on the remote computing device 14-1 to resolve the problem condition.

Note that in the user interface 80-1 illustrated in FIG. 4A, the operator 78 may initially select only a single remote computing device 14, and go through the above-described process individually for each remote computing device 14, and thereby implement different solutions on each of the three remote computing devices 14.

Figure 5A:
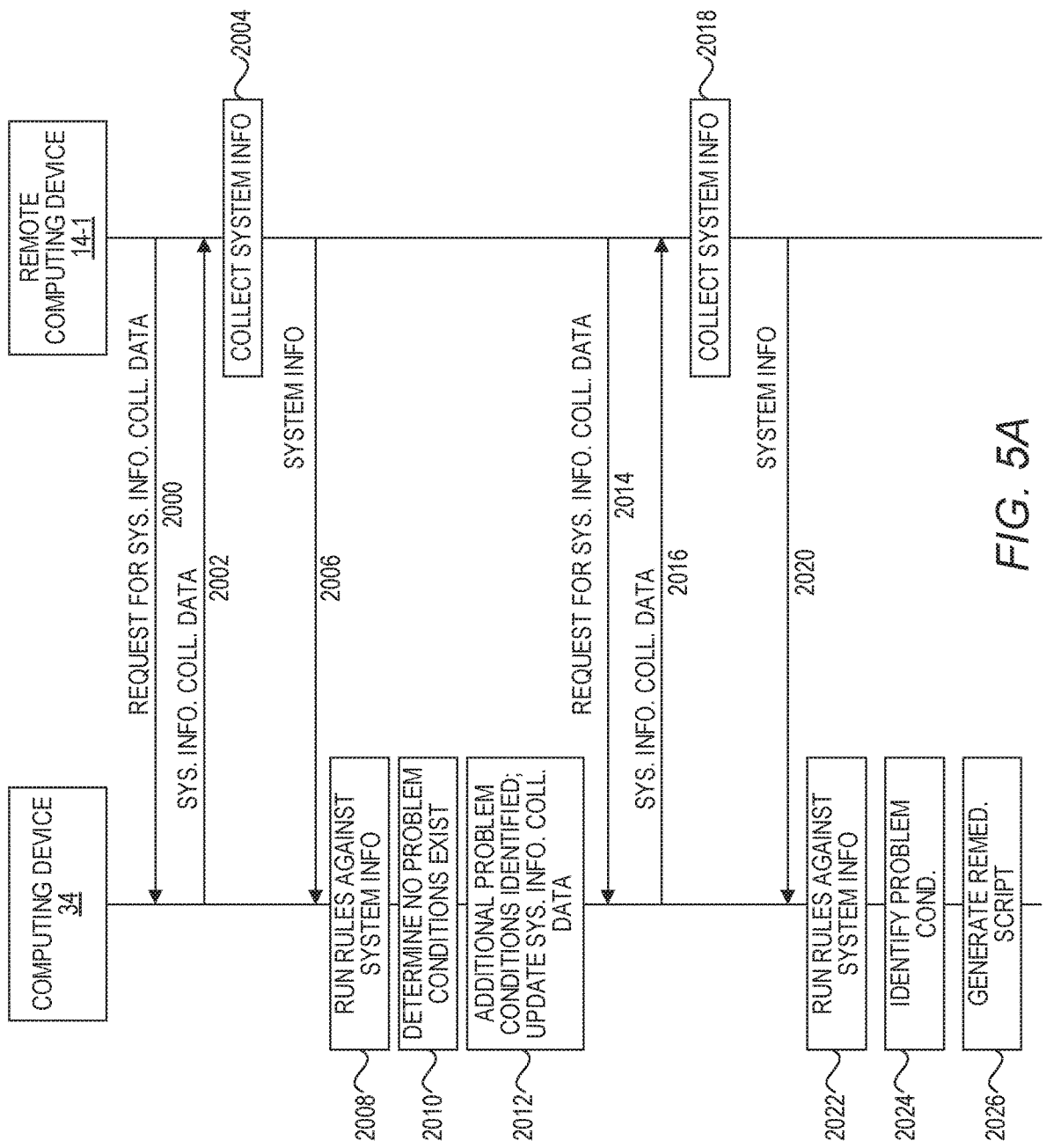
FIGS. 5A-5B illustrate message flow and processing in an environment according to another example.
Figure 5B:
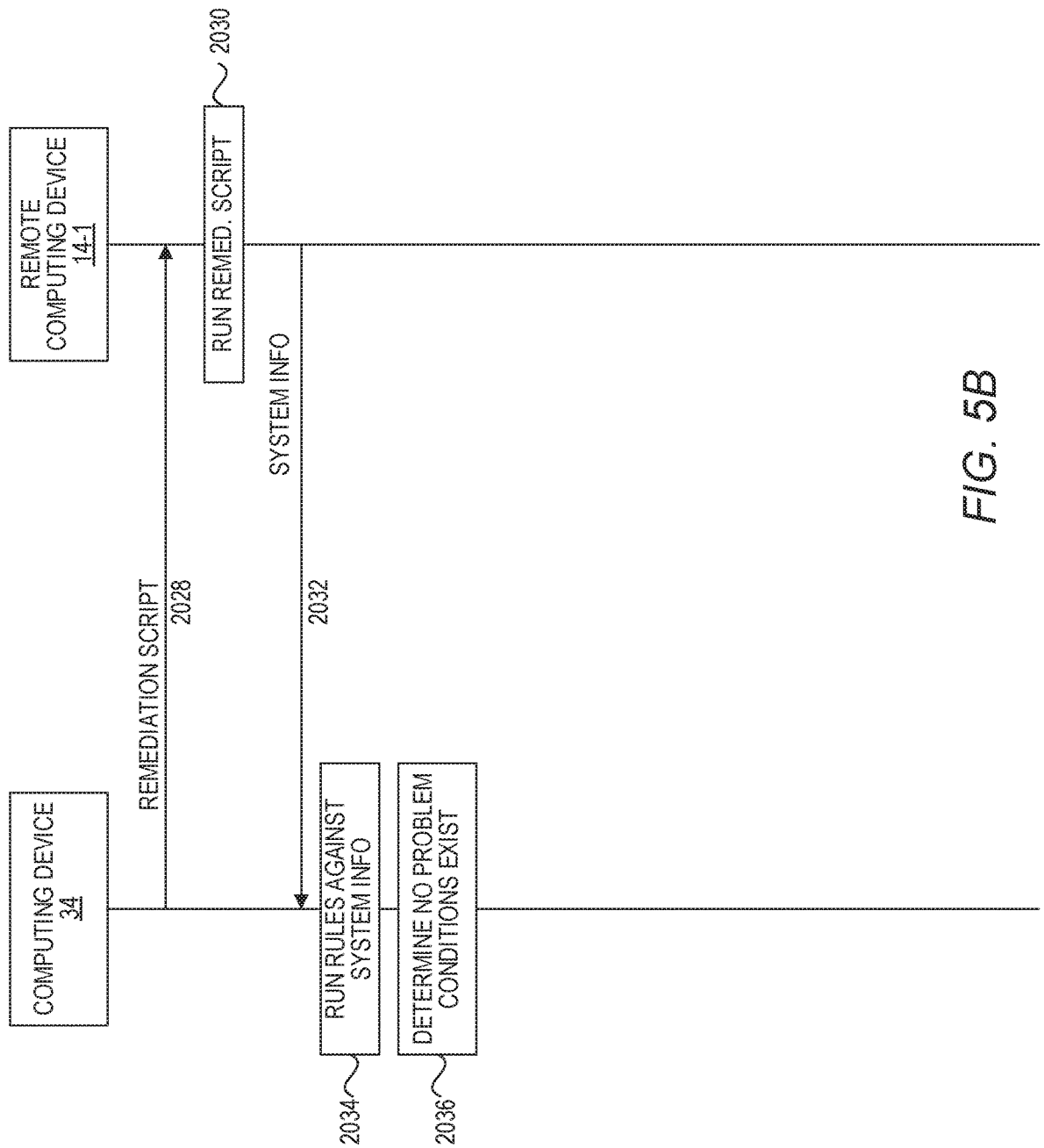

FIGS. 5A-5B illustrate message flow and processing in the environment 28 according to another example. FIGS. 5A-5B will be discussed in conjunction with FIG. 2. Referring first to FIG. 5A, the remote computing device 14-1 sends to the computing device 34 a first request for system information collection data 52 (FIG. 2) that identifies system information 44 to be collected on the remote computing device 14-1 (step 2000). This may be accomplished, for example, by invoking the data collector API 50, for example. The computing device 34 sends, to the remote computing device 14-1, system information collection data 52 that identifies system information 44 to be collected on the remote computing device 14-1 (step 2002). The remote computing device 14-1 collects the system information 44, and sends the system information 44 to the computing device 34 for rule analysis, as discussed above (steps 2004-2006).

The computing device 34 receives the system information 44, runs the plurality of rules 58 against the system information 44, and determines that no problem conditions exist on the remote computing device 14-1 (steps 2008-2010). Assume that SMEs, analyzing additional problems received from one or more remote computing devices 14, as discussed above with regard to FIG. 1, identify a new problem condition, generate a new template 62 that corresponds to the new problem condition, and generate a rule 58 that analyzes system information 44 to detect the problem condition. However, the current system information collection data 52 does not identify the particular data that is necessary to detect the problem condition, so such information is not currently provided by the remote computing device 14-1. In response, the system information collection data 52 is updated such that the additional data is collected by the remote computing device 14-1 and provided in the system information 44 (step 2012).

The remote computing device 14-1 subsequently sends a second request for system information collection data 52 that identifies system information 44 to be collected on the remote computing device 14-1 (step 2014). As discussed above, the remote computing device 14-1 may send such requests periodically or intermittently over time. In response, the computing device 34 sends the updated system information collection data 52 to the remote computing device 14-1 (step 2016). The remote computing device 14-1 collects the system information 44, and sends the system information 44 to the computing device 34 for rule analysis, as discussed above (steps 2018-2020).

The computing device 34 receives the system information 44, runs the plurality of rules 58 against the system information 44, including the new rule 58 generated in step 2012, and determines that a problem condition exists on the remote computing device 14-1 (steps 2022-2024). The computing device 34 generates the remediation script 64 (step 2026), and referring now to FIG. 5B, sends the remediation script 64 to the remote computing device 14-1 (step 2028). The remote computing device 14-1 runs the remediation script 64 to resolve the problem condition (step 2030). The remote computing device 14-1 subsequently collects the system information 44, and sends the system information 44 to the computing device 34 for rule analysis, as discussed above (step 2032). The computing device 34 receives the system information 44, runs the plurality of rules 58 against the system information 44, and determines that no problem conditions exist on the remote computing device 14-1 (steps 2034-2036).

Figure 6:
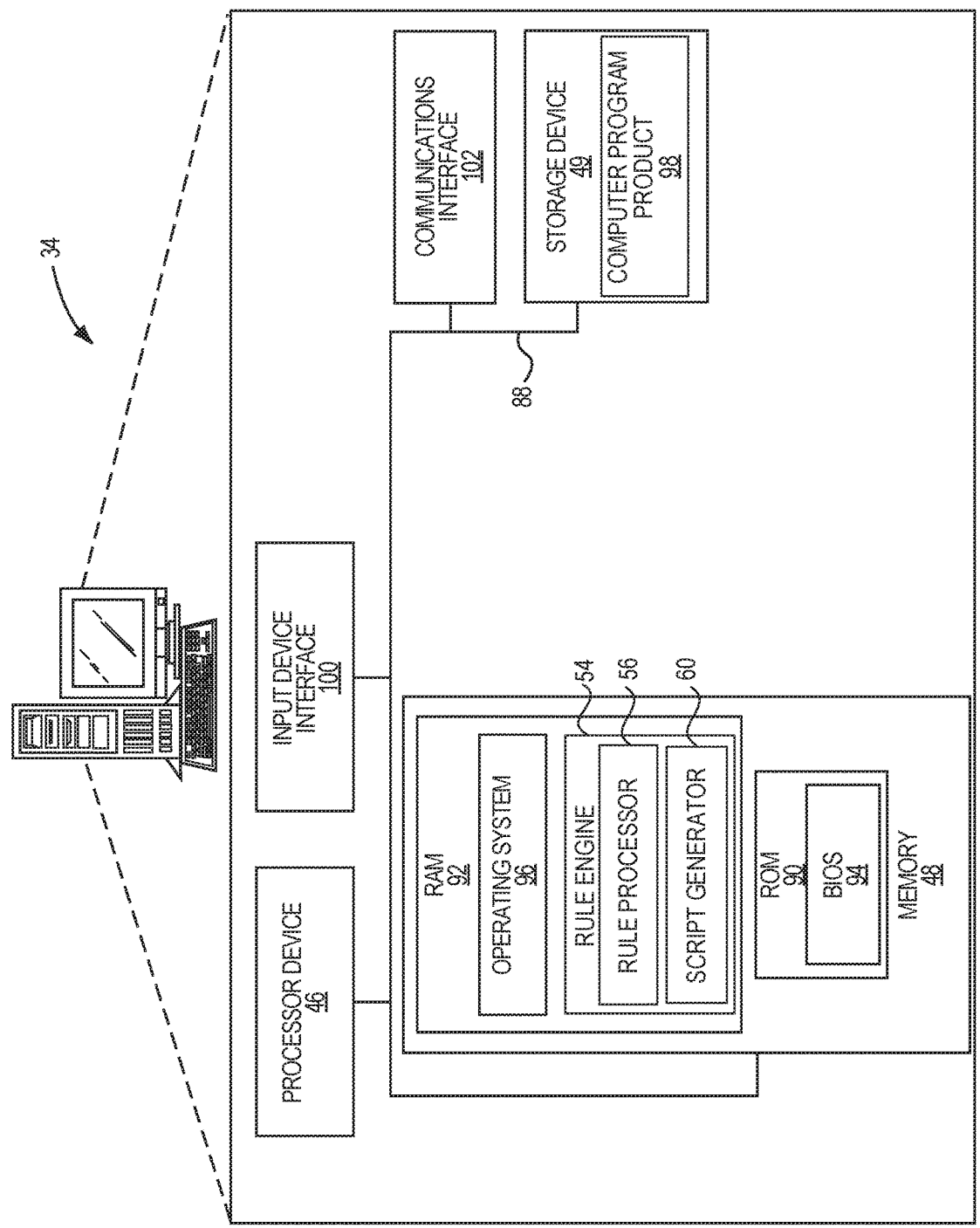
FIG. 6 is a block diagram of a computing device suitable for implementing examples, according to one example.

FIG. 6 is a block diagram of the computing device 34 suitable for implementing examples according to one example. The computing device 34 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 34 includes the processor device 46, the memory 48, and a system bus 88. The system bus 88 provides an interface for system components including, but not limited to, the memory 48 and the processor device 46. The processor device 46 can be any commercially available or proprietary processor.

The system bus 88 may be any of several types of bus structures that may further interconnect to a memory bus (with or without a memory controller), a peripheral bus, and/or a local bus using any of a variety of commercially available bus architectures. The memory 48 may include non-volatile memory 90 (e.g., read-only memory (ROM), erasable programmable read-only memory (EPROM), electrically erasable programmable read-only memory (EEPROM), etc.), and volatile memory 92 (e.g., random-access memory (RAM)). A basic input/output system (BIOS) 94 may be stored in the non-volatile memory 90 and can include the basic routines that help to transfer information between elements within the computing device 34. The volatile memory 92 may also include a high-speed RAM, such as static RAM, for caching data.

The computing device 34 may further include or be coupled to a non-transitory computer-readable storage medium such as the storage device 49, which may comprise, for example, an internal or external hard disk drive (HDD) (e.g., enhanced integrated drive electronics (EIDE) or serial advanced technology attachment (SATA)), HDD (e.g., EIDE or SATA) for storage, flash drive, or the like. The storage device 49 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 49 and in the volatile memory 92, including an operating system 96 and one or more program processes, such as the rule engine 54, the rule processor 56, and the script generator 60, which may implement the functionality described herein in whole or in part.

All or a portion of the examples may be implemented as a computer program product 98 stored on a transitory or non-transitory computer-usable or computer-readable storage medium, such as the storage device 49, which includes complex programming instructions, such as complex computer-readable program code, to cause the processor device 46 to carry out the steps described herein. Thus, the computer program product 98 can comprise software instructions for implementing the functionality of the examples described herein when executed on the processor device 46. The processor device 46, in conjunction with the rule engine 54, the rule processor 56, and the script generator 60 in the volatile memory 92, may serve as a controller, or control system, for the computing device 34 that is to implement the functionality described herein.

A user may also be able to enter one or more configuration commands through a keyboard (not illustrated), a pointing device such as a mouse (not illustrated), or a touch-sensitive surface such as a display device. Such input devices may be connected to the processor device 46 through an input device interface 100 that is coupled to the system bus 88 but can be connected by other interfaces such as a parallel port, an Institute of Electrical and Electronic Engineers (IEEE) 1394 serial port, a Universal Serial Bus (USB) port, an IR interface, and the like. The computing device 34 may also include a communications interface 102 suitable for communicating with a network as appropriate or desired.

Figure 7:
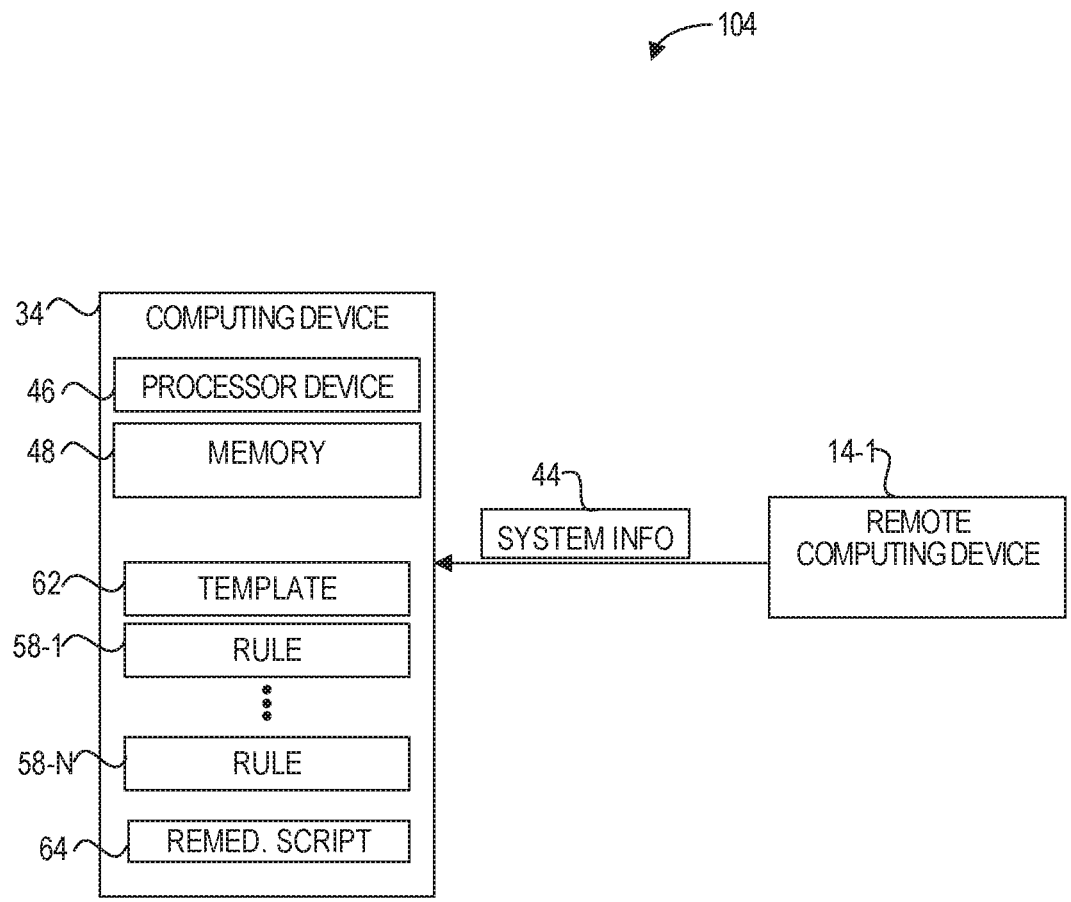
FIG. 7 is a block diagram of an environment according to another example.

FIG. 7 is a block diagram of an environment 104 according to another example. The environment 104 includes the computing device 34 for generating the remediation script 64 to resolve a problem condition in the remote computing device 14-1. The computing device 34 includes the memory 48 and the processor device 46 coupled to the memory 48. The processor device 46 is to access the system information 44 associated with the remote computing device 14-1, and run the plurality of rules 58 that process the system information 44. Each rule 58 is configured to determine whether a problem condition of a plurality of problem conditions exists in the remote computing device 14-1. The processor device 46 is also to determine, by at least one rule 58 based on the system information 44, that a first problem condition exists, and to generate, from a template 62, based on a characteristic of the remote computing device 14-1, a remediation script 64 that, if executed on the remote computing device 14-1, implements a first solution that resolves the first problem condition.

Individuals will recognize improvements and modifications to the preferred examples of the disclosure. All such improvements and modifications are considered within the scope of the concepts disclosed herein and the claims that follow.

What is claimed is:

1. A method of generating a remediation script to resolve a problem condition in a remote computing device, comprising:

receiving at a first time, by a computing device from the remote computing device, a first request for system information collection data that identifies system information to be collected by the remote computing device;

sending, by the computing device, to the remote computing device, first system information collection data that identifies first system information to be collected by the remote computing device;

receiving, from the remote computing device, the first system information;

running, by the computing device, a plurality of rules that process the first system information, each rule configured to determine whether a problem condition of a plurality of problem conditions exists in the remote computing device, the problem condition identifying a potential problem that may occur at a future point in time that has not yet occurred on the remote computing device;

determining, by at least one rule based on the first system information, that the problem condition exists; and generating, from a template, based on a characteristic of the remote computing device, a remediation script that, if executed on the remote computing device, implements a first solution that resolves the problem condition.

2. The method of claim 1 further comprising:

receiving at a second time, by the computing device from the remote computing device, a second request for system information collection data that identifies the system information to be collected on the remote computing device;

sending, to the remote computing device, second system information collection data that identifies second system information to be collected on the remote computing device, the second system information differing from the first system information; and receiving, from the remote computing device, the second system information.

3. The method of claim 1 further comprising:

determining, by the computing device, that a plurality of solutions including the first solution exists to resolve the problem condition;

accessing a profile associated with the remote computing device; and based on information contained in the profile, selecting the first solution.

4. The method of claim 3 further comprising:

determining a problem status that identifies a severity of the problem condition;

determining a disruption status of each solution of the plurality of solutions that identifies a level of disruption to the remote computing device when implementing the respective solution;

determining, based on the information contained in the profile, a mapping of the problem status to a particular disruption status; and selecting the first solution from the plurality of solutions based on the mapping.

5. The method of claim 1 further comprising:

determining, by the computing device, that a plurality of solutions including the first solution exists to resolve the problem condition;

generating solution information that identifies each solution of the plurality of solutions;

sending the solution information to a device; and receiving, from the device, a selection that identifies the first solution of the plurality of solutions.

6. The method of claim 1 further comprising selecting the template from a plurality of different templates.

7. The method of claim 1 further comprising:
receiving an identification of a new problem that occurred on a different remote computing device;
determining a new problem condition based on the new problem;
generating, based on the new problem, a new template from which a new remediation script can be generated to resolve the new problem condition;
determining that additional system information is to be collected from the remote computing device to identify the new problem condition; and
updating the system information collection data to identify the additional system information.

8. A computing device for generating a remediation script to resolve a problem condition in a remote computing device, comprising:
a memory;
a processor device coupled to the memory to:
receive at a first time, from a remote computing device, a first request for system information collection data that identifies system information to be collected by the remote computing device;
send, to the remote computing device, first system information collection data that identifies first system information to be collected by the remote computing device;
receive, from the remote computing device, the first system information;
run a plurality of rules that process the first system information, each rule configured to determine whether a problem condition of a plurality of problem conditions exists in the remote computing device;
determine, by at least one rule based on the first system information, that the problem condition exists;
determine that a plurality of solutions including a first solution exists to resolve the problem condition;
access a profile associated with the remote computing device, the profile identifying operating environment characteristics of the remote computing device;
based on information contained in the profile, select the first solution; and
generate, from a template, based on a characteristic of the remote computing device, a remediation script that, if executed on the remote computing device, implements the first solution that resolves the problem condition.

9. The computing device of claim 8 wherein the processor device is further to:
generate solution information that identifies each solution of the plurality of solutions;
send the solution information to a device; and
receive, from the device, a selection that identifies the first solution of the plurality of solutions.

10. The computing device of claim 8 wherein the processor device is further to:
receive at a second time, from the remote computing device, a second request for system information collection data that identifies the system information to be collected on the remote computing device;
send, to the remote computing device, second system information collection data that identifies second system information to be collected on the remote computing device, the second system information differing from the first system information; and
receive, from the remote computing device, the second system information.

11. A computer program product for generating a remediation script to resolve a problem condition in a remote computing device, the computer program product stored on a non-transitory computer-readable storage medium and including instructions to cause a processor device to:
receive at a first time, from a remote computing device, a first request for system information collection data that identifies system information to be collected by the remote computing device;
send, to the remote computing device, first system information collection data that identifies first system information to be collected by the remote computing device;
receive, from the remote computing device, the first system information;
run a plurality of rules that process the first system information, each rule configured to determine whether a problem condition of a plurality of problem conditions exists in the remote computing device, the problem condition identifying a potential problem that may occur at a future point in time that has not yet occurred on the remote computing device;
determine, by at least one rule based on the first system information, that the problem condition exists; and
generate, from a template, based on a characteristic of the remote computing device, a remediation script that, if executed on the remote computing device, implements a first solution that resolves the problem condition.

12. The computer program product of claim 11 wherein the instructions further cause the processor device to:
determine that a plurality of solutions including the first solution exists to resolve the problem condition;
generate solution information that identifies each solution of the plurality of solutions;
send the solution information to a device; and
receive, from the device, a selection that identifies the first solution of the plurality of solutions.

13. The computer program product of claim 11 wherein the instructions further cause the processor device to:
receive at a second time, from the remote computing device, a second request for system information collection data that identifies the system information to be collected on the remote computing device;
send, to the remote computing device, second system information collection data that identifies second system information to be collected on the remote computing device, the second system information differing from the first system information; and
receive, from the remote computing device, the second system information.

14. The computer program product of claim 11 wherein the instructions further cause the processor device to:
determine that a plurality of solutions including the first solution exists to resolve the problem condition;
access a profile associated with the remote computing device; and
based on information contained in the profile, select the first solution.

15. A method of generating a remediation script to resolve a problem condition in a remote computing device, comprising:
accessing, by a computing device comprising a processor device, system information associated with a remote computing device;

running, by the computing device, a plurality of rules that process the system information, each rule configured to determine whether a problem condition of a plurality of problem conditions exists in the remote computing device;

determining, by at least one rule based on the system information, that the problem condition exists;

generating, from a template, based on a characteristic of the remote computing device, a remediation script that, if executed on the remote computing device, implements a first solution that resolves the problem condition;

determining, by the computing device, that a plurality of solutions including the first solution exists to resolve the problem condition;

accessing a profile associated with the remote computing device, information contained in the profile identifying the remote computing device as a type of environment that comprises one of a development environment and a production environment; and selecting the first solution from the plurality of solutions at least in part based on the type of environment.

\* \* \* \* \*